Figure 1:
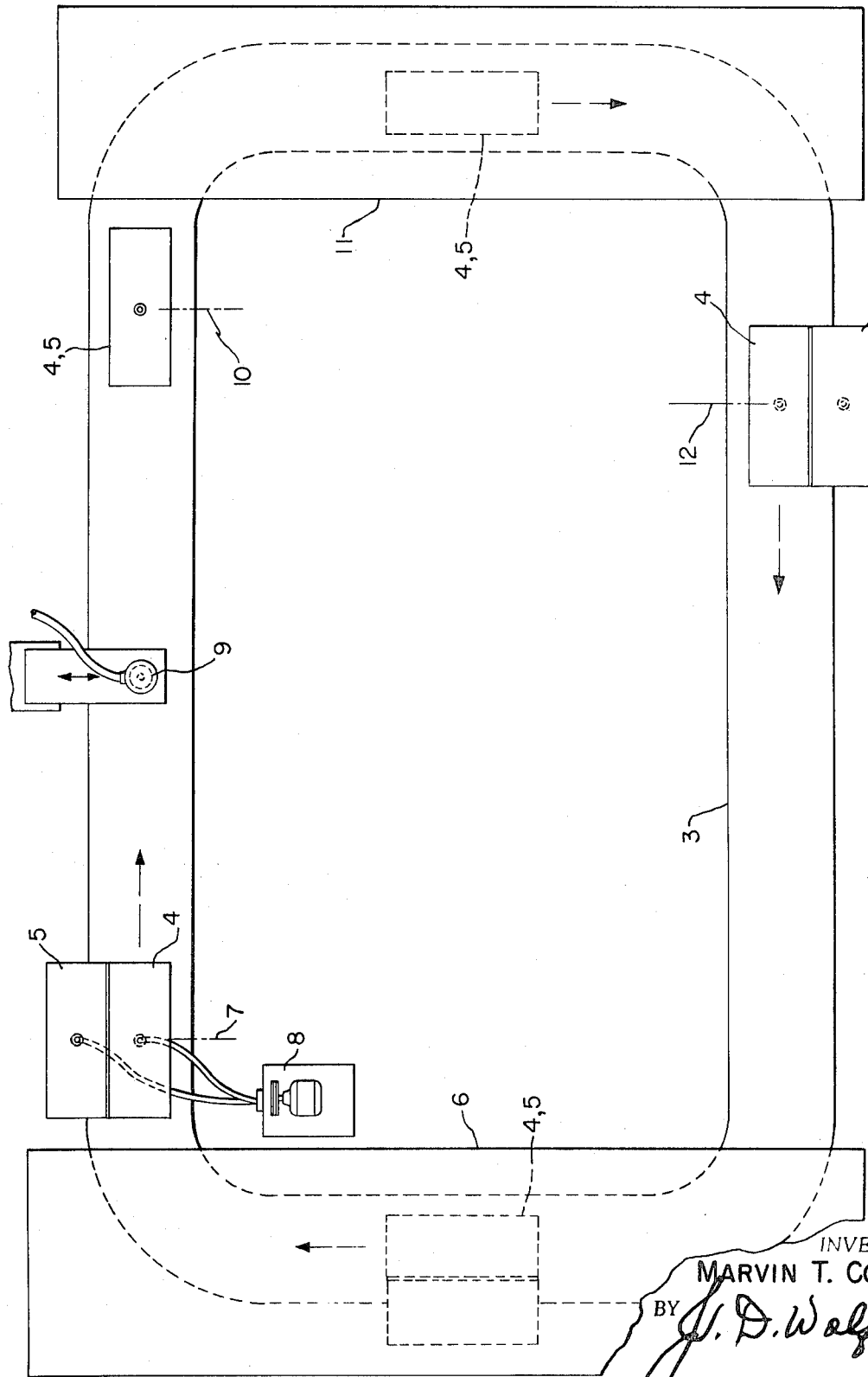

United States Patent

[11] 3,630,819

| [72] | Inventor | Marvin T. Conger<br>Akron, Ohio |
| --- | --- | --- |
| [21] | Appl. No. | 761,451 |
| [22] | Filed | Sept. 23, 1968 |
| [45] | Patented | Dec. 28, 1971 |
| [73] | Assignee | The Goodyear Tire & Rubber Company<br>Akron, Ohio |

[54] FOAMED POLYURETHANE LAMINATES
4 Claims, 4 Drawing Figs.

[52] U.S. Cl. .................................................. 161/161,
161/119, 161/160, 264/45
[51] Int. Cl. .................................................. B32b 3/00,
B32b 3/26
[50] Field of Search ........................................... 264/45;
161/160, 161, 119, 406, 167

[56] References Cited
UNITED STATES PATENTS

| 2,976,577 | 3/1961 | Gould.......................... | 161/161 |
| --- | --- | --- | --- |
| 3,072,582 | 1/1963 | Frost........................... | 161/159 |
| 3,158,529 | 11/1964 | Robitschek et al. .......... | 161/161 |
| 3,389,196 | 6/1968 | Stahl ........................... | 161/161 |
| 2,644,280 | 7/1953 | O'Neil, Jr. ..................... | 161/161 |
| 3,173,826 | 3/1965 | Campbell et al. ............. | 161/161 |

*Primary Examiner*—William J. Van Balen
*Attorneys*—F. W. Brunner and J. D. Wolfe ABSTRACT: This invention relates to laminates useful as building boards or panels and which comprises a rigid foamed polyurethane core covered on at least two faces with a decorative film.

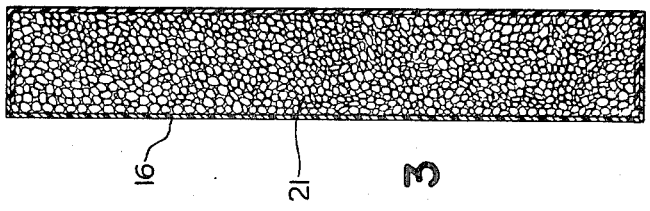
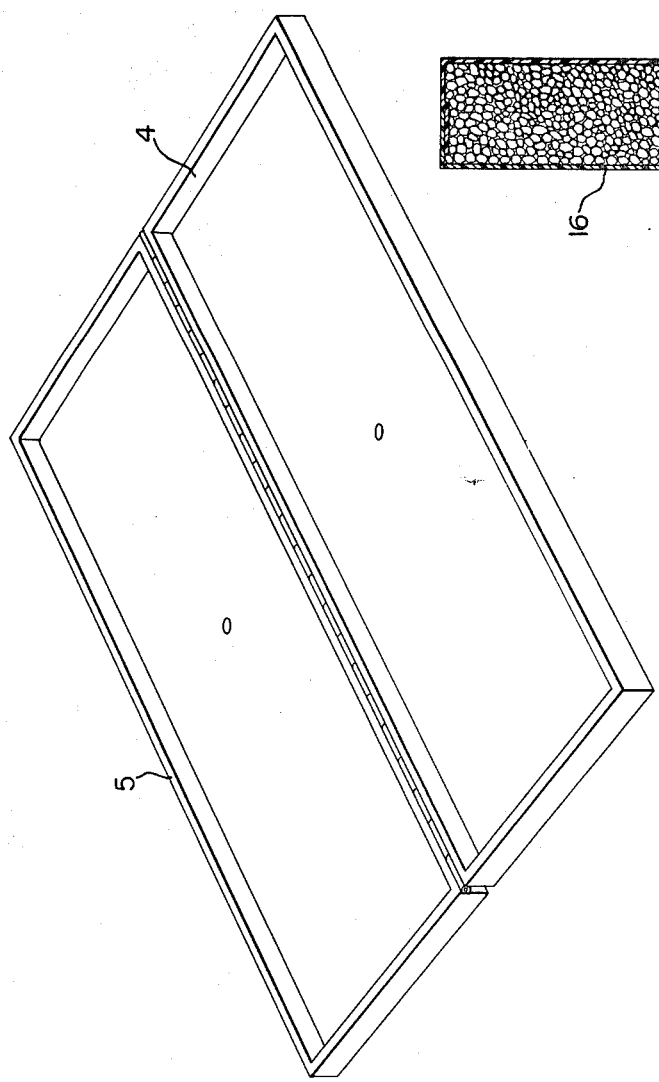
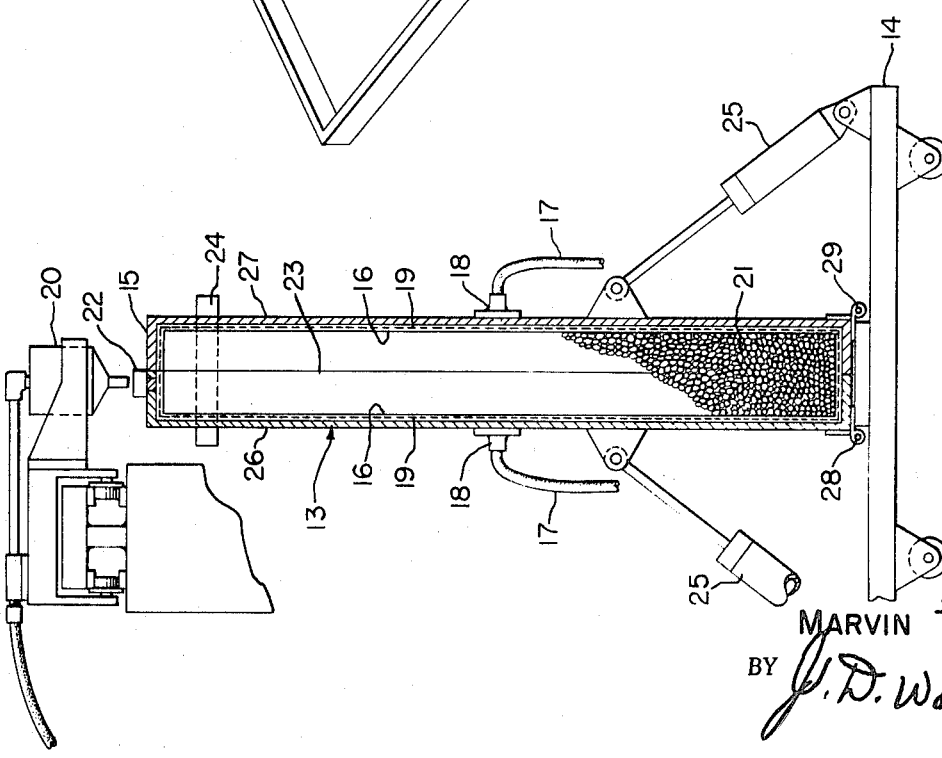

FOAMED POLYURETHANE LAMINATES

This invention generally relates to laminates useful as a building board or panel and the method of making the board, and more particularly, to a board and the method of making it of a foamed polyurethane resin having a decorative film cover.

Foamed synthetic resins, such as polyurethane, are known to have excellent insulating properties as well as excellent abrasion and wear resistance. These foams have been primarily used in the building field as fillers for building materials. Usually the building material, such as plywood, is used to form a sandwich with the foamed polyurethane resin. This sandwich construction took advantage of the excellent insulating properties of polyurethane foam resin. However, the plywood was necessary because the foamed polyurethane lacked the structural strength necessary to withstand the stresses it would encounter if used as the sole building material. Therefore, the prior building manufacturers use plywood or other building material to supply the necessary structural strength for the molded foam synthetic resins.

Polyurethane and other synthetic foam resins have been molded to form a wallboard. These molded foams, however, are brittle and as stated before, lack any degree of structural strength. These boards are not used, for example, as a curtain wall but are used mainly where strength and brittleness are not a factor, merely as an insulation wall covering in the manner plasterboard is used.

The present invention utilizes a laminate having a polyurethane foam core and a covering of a decorative film as a panel or building board which has the beneficial abrasion resistance, wear resistance and insulating properties of foamed synthetic resins and also has the necessary strength and rigidity to withstand some of the stresses encountered by load-bearing building boards such as curtain walls.

It is therefore an object of the present invention to provide a laminate having a foamed core and a decorative film covering to withstand impact and compression and the method of making said laminate.

Another object of the present invention is to provide a decorative film covered polyurethane foam suitable for use as a building board which may be used as a curtain wall of a house or similar building structure or as a door.

A further object of this invention is to provide a method of obtaining a laminate having a shaped porous core which is formed and adhered to the film at the time the laminate is shaped.

Other objects and advantages of the present invention will be apparent from the following detailed description taken in conjunction with the accompanying figures of the drawings, wherein FIG. 1 is a plan view of a molding assembly, FIG. 2 is an enlarged perspective view of a mold having its lid open and FIG. 3 is a cross section through the laminate.

FIG. 4 is another embodiment showing a cross section mold standing upward in a vertical position and a movable pouring head above the mold.

Referring specifically to FIG. 1, numeral 3 represents a continuous endless conveyor system having various stages thereon for performing work on the mold. The mold 4 with the lid 5 open is shown on the conveyor system as it comes out of the mold temperature conditioning unit 6 and is stopped temporarily in station 7 to permit the film to be placed in the mold 4 and in the lid 5. The film is spread and adhered to the lid and the mold by placing a vacuum on the mold and lid by the vacuum means 8 including a vacuum pump, lines and flexible line with quick connector terminals. Thus, with the film spread out smoothly within the cavity of the mold body and the lid, the mold is moved past a foam pouring head 9 where sufficient foamable material is added to the mold to fill the mold when it has foamed. The mold moves from under the pouring head 9 and the lid is closed in station 10 just before the mold passes into and through the mold temperature adjusting means 11. As the mold leaves the heating means 11, the lid is opened within station 12 and the molded laminated article is removed from the mold and then the mold is cleaned prior to passing into the mold conditioning unit 6 to begin the next molding cycle.

Referring more specifically to FIG. 2 it will be noted that the molds are shown as essentially rectangular but other shapes including irregular can be used. Both the mold body and the lid have recesses therein sufficient to accommodate a laminated article of the desired size. For instance, where the mold is used to make a door the mold will be approximately 36×82×1¾ inches or the dimensions desired for appropriate panel or door. To facilitate the placing of the film within the mold and the lid, and getting the film properly adhered to in these positions, it was found to be expedient to place an open woven fabric within the mold as this facilitates obtaining a vacuum over the entire surface of the mold body and the lid area. Thus, if we use an open weave fabric to facilitate placing or pulling the vacuum on the lid and/or mold, it will not be possible to obtain the characteristics in the film corresponding to those engraved on the mold. Therefore, an auxiliary means will be needed in this instance, to effect or impart the proper embossing or other decorative effects on the finished laminate.

This can be readily achieved by placing an embossed breathable paper within the mold underneath the film and then pulling a vacuum on the mold to move the embossed paper and the film down within the mold cavity and the lid in the manner heretofore described. A further advantage of using embossed paper is that not only is the article or laminate produced having the desired embossing but the embossed paper may remain on the laminate to serve as a built-in protection or wrapping for the laminate during storage, shipping and its preparation for use. Thus, when the laminate is to be used the embossed paper may be removed to display the surface of the laminate without it being marred during shipping or storage.

The specific nature of this invention may be more readily understood by using a decorative film such as a polyester or a polyvinyl chloride film or other known films that have or can have impressed thereon the desired decorative effect. The nature of these decorative effects may vary widely but in general they comprise printing of a decorative design, such as the appearance of an oak, mahogany or walnut paneling, on the film and then the film is used to form the laminate. Also, the film can have thereon the desired design or surface features.

With the film held snugly in place in the lid and/or the mold cavity by the vacuum, usually about 26 to 29 inches of mercury, then a polyurethane foamable reaction mixture in an amount sufficient to fill the mold after foaming is added to the mold. Then the mold is closed and the foamable reaction mixture is allowed to foam and set. The rate of setting and curing of the foam may be enhanced by raising the temperature of the mold to about 100° to 200° F. Usually in about 10 to 20 minutes, depending on the temperature of the mold, the mold may be opened and the laminated article removed from the mold.

It should be appreciated that by adjusting the mold temperature relative to the temperature of the reaction mixture the skin of the foam or its outer layers can be controlled in density to thereby improve its impact resistance. Therefore, in some cases it is desirable that the mold be at least 10° F. cooler than the foamable mixture to increase the density of the foam outward from the center of the mold to thereby improve its impact resistance.

It is desirable to trim off the excess film from the molded article to give it a finished appearance. If the laminated article has not been given a post heat cure, it is preferred that it rest in a flat position for several days and preferably about 7 days at about 70° F. to permit the foam to develop its optimum cure and physicals.

The present invention provides the building industry with a lightweight board or panel that can be used to construct a house, apartment building, motels and similar structures that can have excellent insulation properties. The boards and panels of the instant invention may be conveniently handled and rapidly installed by relatively few workers. As a result the overall cost of the building is reduced. Reduction in cost, of course, is a major consideration in the highly competitive building industry.

In another embodiment the mold 13 in a vertical position as shown in FIG. 4 is moved preferably on a cart or dolly 14 to a pour station where the foamable mixture is poured from a movable pouring head 20 into the open topside 15 of the mold. Prior to the time the foamable mixture is added to the mold a decorative film 16, for example, of polyester or polyvinyl chloride, is placed in the mold and a vacuum pulled on the mold by vacuum lines 17 attached to fittings 18 in each of the upright parts of the mold. It should be noted that loosely woven fabric 19 inside each half of the mold serves to distribute the vacuum over the inside of the mold and to hold the film 16 in the desired position inside the mold. As the foamable mixture 21 foams within the mold, it fills the mold. Therefore, the pouring openings 22 in the top of the mold are closed and the pressure on the inside of the mold will rise to 1 to 20 or even 50 pounds per square inch. After the foam has set and cured and the pressure is dissipated through seam 23 of the mold, the mold is opened by unlocking the locking means such as clamps 24 distributed around the mold. Then the hydraulic rams 25 are actuated to cause the two mold halves 26 and 27 to pivot about pivot points 28 and 29 to move the two mold parts to the open position so the molded article can be removed from the mold and more film be place therein to prepare the mold for the preparation of another article.

The foams suitable for use in this invention are produced by reacting a polyether glycol of about 700 to about 1,500 and preferably 900 to 1,500 molecular weight having incorporated therein about 30 to about 150 parts and preferably about 75 to 125 parts of a suitable wood flour with an organic polyisocyanate that has a functionality greater than 2 with a suitable amount of a monomeric polyol, usually about 4 to 30 parts where polyol has a molecular weight less than 500, together with a foaming agent. It should be readily apparent that suitable polyurethane catalysts may be used to advantage to control the rate of reaction of the isocyanate with the polyether or the monomeric polyols and also to regulate the rate of foaming and curing of the resulting product.

Representative examples of the polyether diols that can be utilized are polypropylene ether diol, polybutylene ether diol and a mixed polypropylene-ethylene ether diol, or mixtures of these diols.

The monomeric polyols, preferably of three to four hydroxyl groups, that can be used in making the rigid polyurethane foams of this invention are those having a molecular weight less than about 500 and preferably less than 300 such as the following representative members: trimethylol propane, trimethylol ethane, glycerine, hexane triol and N,N,N',N'-tetrakis-(2-hydroxylpropyl) ethylene diamine. Since trimethylol propane is a solid it is advantageous to use it in conjunction with sufficient liquid polyol such as glycerine to give a pumpable mixture and thereby facilitate the formation of the reaction mixture.

The wood flours useful in this invention are the nut or shell flours obtained by grinding up walnut and pecan shells and the shells of related nuts until they obtain a fineness of a powder and preferably sufficiently fine to pass through a 100-mesh U.S. Standard Screen. These wood flours are preferably used in the amount of about 75 parts to about 125 parts per 100 parts of the polyester glycol.

The organic polyisocyanates useful in making the rigid foams of this invention are those which contain more than two and preferably about an average of 2.5 to 2.8 or more isocyanate groups per molecule of the mixture. A broad class of organic polyisocyanates suitable for use in this invention are those prepared from an aldehyde amine reaction product which has been phosgenated to give a polyisocyanate or mixtures of polyisocyanates. The preparation of isocyanates of this type is illustrated in U.S. Pat. No. 2,683,730. It should be appreciated that the methylene di(phenylisocyanate) content of the mixture can range from about 85 to about 10 percent by weight. Also, organic polyisocyanates such as tri(phenylene isocyanato) methane may be used. Normally, the amount of organic polyisocyanate used will be stoichiometrically calculated to give an NCO/OH ratio of from about 0.9 to 1.15, or up to 1.3. A 1.1:1 ratio is preferred based on the polyether glycol used. The blowing agent may be water and can be used in about 0 to 5 parts per 100 parts of polyether glycol provided an auxiliary blowing agent is present, at least when the water content is 0 percent. Also, the low boiling auxiliary blowing agents such as methylene chloride or the fluorinated hydrocarbons, for instance, dichloro difluoroethane can be utilized to obtain a rigid foam having the desired characteristics with or without the use of water.

Representative examples of the many embodiments of this invention are set forth in the examples below where all parts are by weight unless otherwise designated. Although the examples use the one-shot method of producing the foam, it should be appreciated the two-shot or other methods can be used, too.

EXAMPLE I

A rigid polyurethane foam was prepared by preblending 22 parts of a polypropylene ether glycol of 1,000 molecular weight, 3 parts of N,N,N',N'-tetrakis-(2-hydroxylpropyl) ethylene diamine, 1.5 parts glycerine, 1.5 parts trimethylol propane and 20 parts of walnut shell flour, 0.017 parts of dibutyl tin dilaurate, 0.1 parts dimethyl amino-2-methyl-1-propanol and 0.2 parts of water. These ingredients were intimately mixed to give a component mixture A, then this component mixture A was blended and thoroughly mixed with 22 parts of a commercial organic polyisocyanate mixture having an average NCO value of about 2.8 and made by phosgenation of an acid rearranged product of the reaction product of formaldehyde and aniline.

This mixture was poured from the pouring head into a door mold 15 containing a plasticized polyvinyl chloride film in sufficient amounts to fill the mold with foam. The mixture began to cream in about 30 seconds and the foaming filled the mold and set in about 5 minutes. The resulting foamed-in-place laminate was allowed to stand in the mold for 10 to 12 hours at room temperature to attain a complete cure before being removed from the mold. This foamed laminate was hard and tough and could be nailed to wood in the normal manner to attach the foamed laminate to wood without the foam crushing or the nail pulling out. Thus, planular laminates having decorative facings were made.

EXAMPLE II

Other foams that were used to mold laminated doors were made using the recipe shown in table 1 by dispersing all the ingredients in the polypropylene ether glycol and then adding a commercial organic polyisocyanate mixture, available under the trade name "Mondur MR" to effect the formation of the foam. The resulting foam was poured into a suitable mold about 6×6×⅞ inches containing a polyester film and allowed to foam and cure by standing at room temperature for 3 days. The products made using the recipes of table 1 were then subjected to impact and deflection load tests. The results of these tests are recorded in table 2 along with the density of the resulting foam:

TABLE 1

| Formulations For Density Variations | | | |
|---|---|---|---|
| | 5 | 6 | 7 |
| Polypropylene ether glycol molecular weight 1,000 | 22 | 22 | 22 |
| Quadrol* | 3 | 3 | 3 |
| Walnut Shell Flour | 20 | 20 | 20 |

|                    |       |      |      |
|--------------------|-------|------|------|
| Water              | 0.066 | 0.33 | 0.66 |
| Dibutyl tin dilaurate | 0.022 | 0.022 | 0.022 |
| DMAMP**            | 0.048 | 0.048 | 0.048 |
| Mondur MR***       | 16    | 16   | 16   |

*Quadrol is N,N,N',N'-tetrakis-(2-hydroxyl propyl) ethylene diamine.

**DMAMP is the abbreviation for dimethyl amino-2-methyl-1-propanol.

***Mondur MR is a mixture of organic polyisocyanate having an average NCO content of about 2.7–2.8 supplied by Mobay Chemical Company.

Table 2 gives the results of the stiffness and impact tests performed on the above specimens. The stiffness tests were run by clamping a specimen 6×1×⅞ inches so that a cantilever beam was formed. A load was applied so that the distance from the support to the load was 4⅞ inches. The measurement taken was the load required, in grams, to deflect the beam one-fourth inch. The impact test was performed using a Gardner Impact tester. The impact, in inch-pounds, at which first permanent damage to the specimen was observed, is recorded. In addition, the diameter of the cavity created by an impact of 30 inch-pounds is recorded. It should be noted that using lauan mahogany plywood facings in the same construction, the first permanent damage was observed at less than 1 inch-pound and the diameter of the damaged cavity at 30 inch-pounds was 0.380 inch.

TABLE 2.—EFFECT OF DENSITY ON STIFFNESS AND IMPACT

| Compound No. | Density (lbs./cu. ft.) | Impact | | ¼" deflection load (grams) |
|---|---|---|---|---|
| | | First damage (in.-lbs.) | Diameter cavity (inches) | |
| 5 | 42.7 | 30 | 0 | 1,937 |
| 6 | 30.3 | 30 | 0 | 795 |
| 7 | 23.2 | 2 | .575 | 561 |

These materials appeared to show rubbery-type impact which accounts for the high impact properties of the doors.

EXAMPLE III

Other foam recipes were used to form foamed laminates having a decorative film on its face. Some of these are shown in table 3, where all the ingredients were premixed except the Mondur MR which was added at the time the foaming was desired. The cured foam samples made using the formulations of table 3 were then subjected to impact and deflection load tests. The results of these tests are shown in table 4.

TABLE 3

| | Formulations For Cross-link Density Variations | | | |
|---|---|---|---|---|
| | 8 | 9 | 10 | 11 |
| Resin 1010* | 22 | 22 | 22 | 22 |
| Quadrol | 3 | 3 | 3 | 3 |
| Glycerine | — | 1 | 2 | 3 |
| Walnut Shell Flour | 20 | 20 | 20 | 20 |
| Water | 0.66 | 0.66 | 0.66 | 0.33 |
| DMAMP | 0.048 | 0.048 | 0.048 | 0.048 |
| Dibutyl Tin Dilaurate | 0.022 | 0.022 | 0.022 | 0.022 |
| Mondur MR | 14 | 18 | 24 | 28 |

*Resin 1010 is a polypropylene ether glycol of 1,000 molecular weight.

TABLE 4.—EFFECT OF CROSSLINKING ON IMPACT AND STIFFNESS

| Compound No. | Density (lbs./cu. ft.) | Impact | | ¼" deflection load (grams) |
|---|---|---|---|---|
| | | First damage (in.-lbs.) | Diameter cavity (inches) | |
| 8 | 22.1 | 8 | .475 | 442 |
| 9 | 18.9 | 3 | .435 | 1,084 |
| 10 | 19.5 | 5 | .503 | 1,833 |
| 11 | 22.5 | 5 | .410 | 2,117 |

In this specification films have been used to designate sheets of plastic, preferably of a thermoplastic or set nature, of about 3 to 30 mils thickness, for example, an ABS resin, polyurethane resin, pvc resin or vinyl resin, but metal foils such as aluminum, magnesium or alloys of commensurate thickness and flexiblity, i.e., 1 to 10 mils, can also be used where they are formable or preformed to fit the mold. Also, sheets is used to designate a film which has either no design or a design thereon, with the design including printing, embossing or any of the other methods of imparting design to film.

The following tests were performed on the foamed laminated doors prepared according to the foregoing examples, using the following test procedures:

The Slam test was performed on a door slammer comprising a rigidly held frame into which a door is hung in a normal manner using commercially available hinges. A hole is drilled through the door to accommodate an eyebolt at approximately the location of the knob. The eyebolt was flexibly attached to a hydraulic cylinder device that pulled the door open 90° and quickly released it. Attachment to the eyebolt was by a length of rubber tubing. A spring was used to slam the door upon its release. A counter was provided to count the number of slams. One slam cycle required approximately 6 seconds. The test was run continuously during which periodic checks were made on the condition of the door. Particular attention was given to the condition of the screws holding the hinges on the door. For these tests, 2½ inches No. 12 wood screws were used. Some commercially available doors have shown excessive damage in less than 50,000 hard slams.

The Racking test in the plane of the door was performed according to Federal Specification LLL–D–00581. The door was supported rigidly on one edge in the slammer frame as in service and a 200-pound load was applied to the unsupported stile. Racking in the plane of the door shall not exceed 0.1 inch, and on removal of the load, permanent set shall not exceed 0.02 inch.

The Racking test perpendicular to the plane of the door was performed according to Federal Specification LLL–D–00581. The door was supported horizontally on two diagonally opposite corners. A load of 100 pounds was applied to each of the other corners. A straight edge was laid diagonally across the two supported corners. Measurements were taken from the center of the door to the bottom of the straight edge. Racking in the plane of the door shall not exceed 3 inches at the center of the door and on removal of the load, the permanent set shall not exceed one-eighth inch.

Due to the fact that the doors prepared according to this invention were somewhat thick in the center, it was difficult to obtain good measurements using a straight edge. An alternate method of measuring racking in the plane of the door was used. It consisted of measuring the change in the distance from the floor to the weighted corners due to the application of the load. By taking the average of the change of the two corners the results should approximate that of racking in the center of the door.

An additional racking test performed during this program was to check the racking perpendicular to the plane of the door over a 24-hour period. This is not required in the Federal specification, but since these doors were made from plastic materials, some knowledge of the creep properties was needed.

The Warp test was performed according to the Federal Specification LLL–D–00581. The door was placed in a horizontal position and the face was covered with wet cloth for 24 hours. After this period, the cover was removed and a straight edge was laid diagonally across the face of the door. The distance from the straight edge to the center of the door was measured. Warp for the door shall not exceed three-fourths inch.

The Impact test was performed on a finished face of the door using a Gardner impact tester. A 4-pound weight with a ⅜-inch ball point was used. The specimen was tested at 4 inch-pounds increments. The diameter of the indentation and the percent of break around the cavity were recorded.

Table 5 presents the results of Slam, Racking and Warping tests on doors made according to the foregoing examples which had a polyester film on the two planular faces.

TABLE 5

| | Slam Rack And Warp Test Results | | |
|---|---|---|---|
| Door Number | 2 | 3 | 4 |
| Slam | | | |
| Number of slams | 213,000 | 306,500 | 175,906 |
| Damage to door | None | None | None |
| Racking | | | |
| In Plane of Door | | | |
| Initial (in) | 0 | | 0.1 |
| Permanent set (in) | 0 | | 0 |
| Perpendicular to Plane | | | |
| Initial (in) | 1 | 2⅝ | 2 13/16 |
| Permanent set (in) | | | 1/8 |
| After 24 hrs (in) | 1 15/16 | 4 11/32 | |
| 24 hr Permanent set (in) | 11/32 | 1 3/16 | |
| Warp (in) | | | 0 |

Door no. 2 was installed in the slammer test frame. The top and center hinges were common door hinges while the bottom hinge was a bearing hinge. After 100,000 slams, the top hinge was showing some wear. After 134,000 slams the top hinge had worn one-sixteenth inch and the center hinge was showing some wear.

The test was terminated after 213,000 slams. Upon inspection, the door showed no sign of damage and the screws holding the hinges were tight. Both the top and center hinges showed considerable wear while the bottom hinge showed none. This indicates that bearing hinges should be used on all future slam tests.

In all of the slam tests the door was in good condition when the test was terminated. After door 4 had been removed from the test frame, it was discovered that one screw was missing from the bottom hinge and a second screw was loose. Upon investigation, it was found that these screws had been placed in an area of a cavity.

The racking tests perpendicular to the plane of the door are based on the alternate method of measuring described in the test procedures. For door 4 both methods of measuring were used. The racking measured according to Federal Specification procedures was 29/16 inches. This was one-eighth inch less than determined by the alternate procedure. The permanent set, by the Federal specification procedure, was one-sixteenth inch. Obviously, there is some discrepancy between the two methods of determining racking, however, since door 4 was tested by both procedures and was within the limits of the specification, it was satisfactory.

It should be pointed out that a Weyerhouser stave core door was tested in the racking test. It was slightly warped at the beginning of the test so that, when the straight edge was laid diagonally across the supported corners, one end was one-sixteenth inch off the corner. The racking by Federal specification procedures was one-fourth inch. However, by the alternate procedure, it was three-fourths inch. This shows that the test doors are considerably more flexible than the stave core door even though they are within Federal specifications.

The 24-hour racking tests were performed to determine the amount of creep that can be expected from these doors. This is shown in table 6 for door 3.

TABLE 6

| | Creep In Door 3 | | |
|---|---|---|---|
| Time | Corner 1 Measurement | Corner 2 Measurement | Rack |
| No Load | 8 15/16 in. | 8 15/16 in. | |
| Initial Loading | 6⅞ in. | 6⅞ in. | 2⅝ in. |
| 19 Hours | 4⅞ in. | 5 1/16 in. | 4 9/32 in. |
| 24 Hours | 4¼ in. | 4 15/16 in. | 4 11/32 in. |

It can be seen that the creep was high in the initial stages but was only one-sixteenth during the last 5 hours of the test. Similar results were obtained on door 2.

Impact tests were performed on the lower density side of door 4. The results are compared with two standard door constructions, one with hardboard skins and the other with birch plywood skins. The results are shown in table 7.

TABLE 7

| | Gardner Impact Test | | |
|---|---|---|---|
| Force (inch-lb.) | Hardboard | Birch | Door No 4 |
| 4 Break % | None | None | None |
| Cavity Dia | ⅛ in. | ¼ in. | 3/16 in. |
| 8 Break % | None | None | None |
| Cavity Dia | 3/16 in. | 9/36 in. | 9/32 in. |
| 12 Break % | 25 | None | 25 |
| Cavity Dia | 7/32 in. | 9/32 in. | 5/16 in. |
| 16 Break % | 50 | 25 | 100 |
| Cavity Dia | ¼ in. | 9/32 in. | 11/32 in. |
| 20 Break % | 25 | 50 | 100 |
| Cavity Dia | 5/32 in. | 5/16 in. | ⅜ in. |
| 24 Break % | 75 | 50 | 100 |
| Cavity Dia | 11/32 in. | 11/32 in. | 7/16 in. |
| 28 Break % | 100 | 50 | 100 |
| Cavity Dia | 9/32 in. | 11/32 in. | 7/16 in. |
| 32 Cavity Dia | ⅜ in. | 5/16 in. | 7/16 in. |
| 36 Break % | 100 | 50 | 100 |
| Cavity Dia | ⅜ in. | 11/32 in. | 7/16 in. |

While certain representative embodiments and details have been shown for the purpose of illustrating the invention, it will be apparent to those skilled in this art that various changes and modifications may be made therein without departing from the spirit or scope of the invention.

What is claimed is:

1. A laminated structural member of essentially a planular configuration having a porous core covered on at least two faces with a decorative film, said member being able to withstand 50,000 hard slams, said porous core being the reaction product of a polyurethane reaction mixture comprised of 100 parts of a polyether glycol of about 700 to 1,500 molecular weight, about 75 to 125 parts of an organic polyisocyanate having a functionality greater than 2, 0 to 4 parts of water, 75 to 125 parts of nut flower and 4 to 30 parts of a tri to tetra functional hydroxyl compound of less than 500 molecular weight with the proviso that when water is zero an auxiliary blowing agent is used.

2. The laminated structural member of claim 1 wherein the film is a thermoplastic resin.

3. The laminated structural member of claim 1 wherein an embossed paper is in contact with the film to protect the film.

4. The laminated structural member of claim 1 wherein the tri to tetra functional hydroxyl compound is selected from the group consisting of glycerine, quadrol and mixture thereof.

* * * * *

PO-1050
(5/69)

UNITED STATES PATENT OFFICE
CERTIFICATE OF CORRECTION

Patent No. 3,630,819      Dated December 28, 1971

Inventor(s) Marvin T. Conger

It is certified that error appears in the above-identified patent and that said Letters Patent are hereby corrected as shown below:

Column 3, line 67, change "polyester" to -- polyether --;

Column 7, line 48, change "29/16" to -- 2-9/16 --; and

Column 8, line 12, add -- inch -- after "one-sixteenth --.

Signed and sealed this 21st day of November 1972.

(SEAL)
Attest:

EDWARD M. FLETCHER, JR.
Attesting Officer

ROBERT GOTTSCHALK
Commissioner of Patents